3,052,424
AUTOMATIC SPIN CASTING REEL
Casimir J. Skraban, 2427 N. Central Park, Chicago, Ill.
Filed Nov. 6, 1959, Ser. No. 851,449
9 Claims. (Cl. 242—84.2)

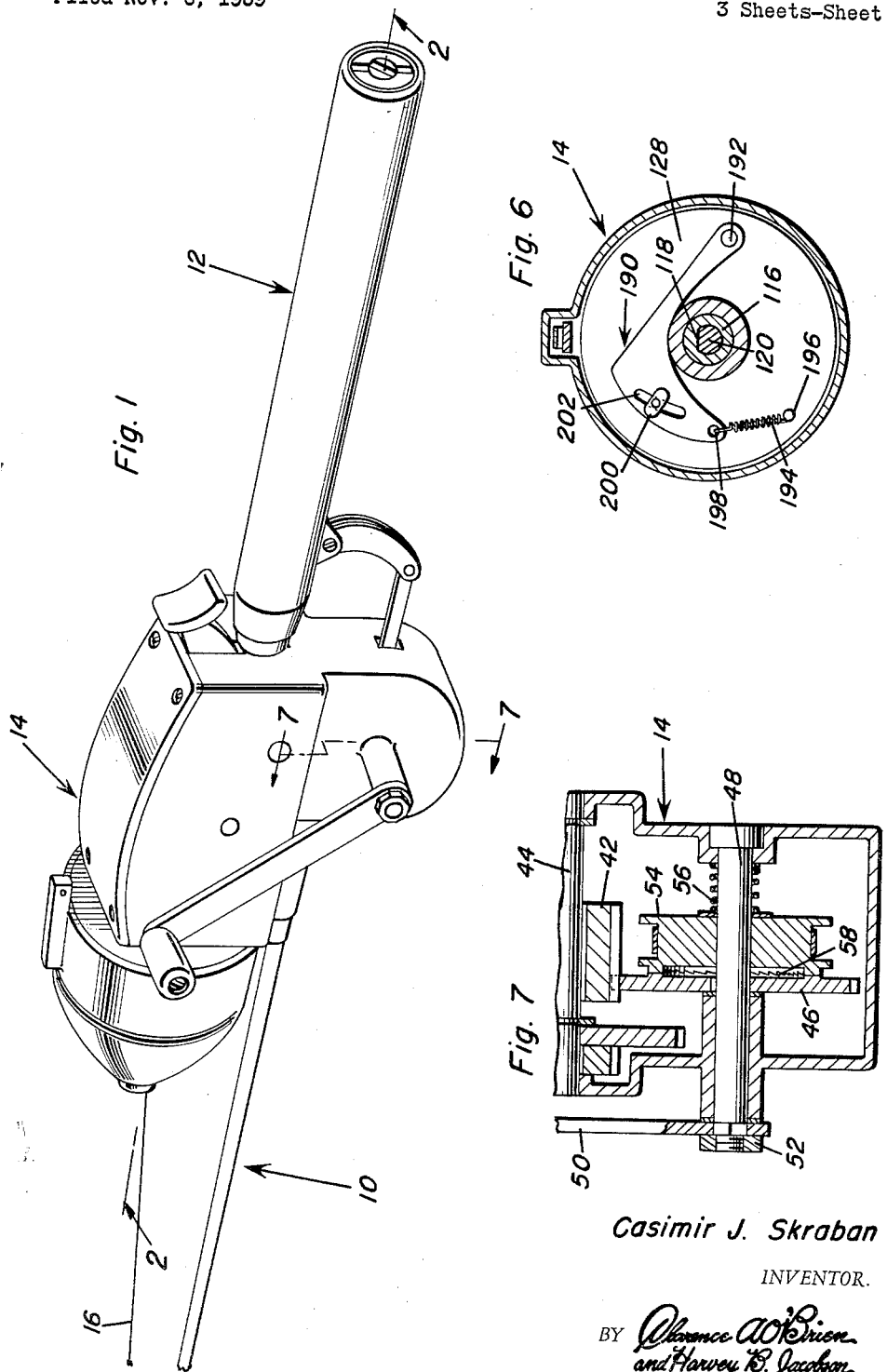

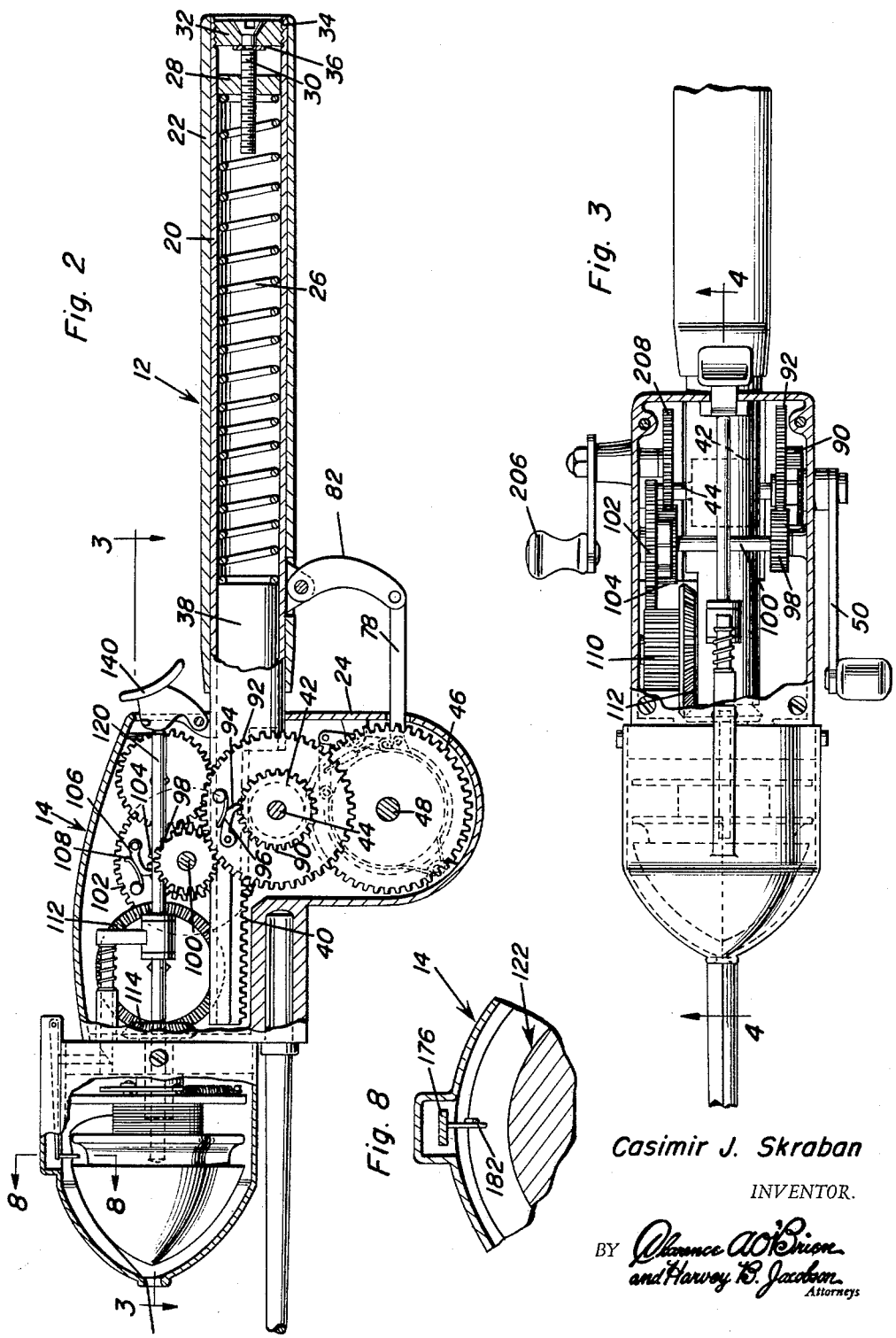

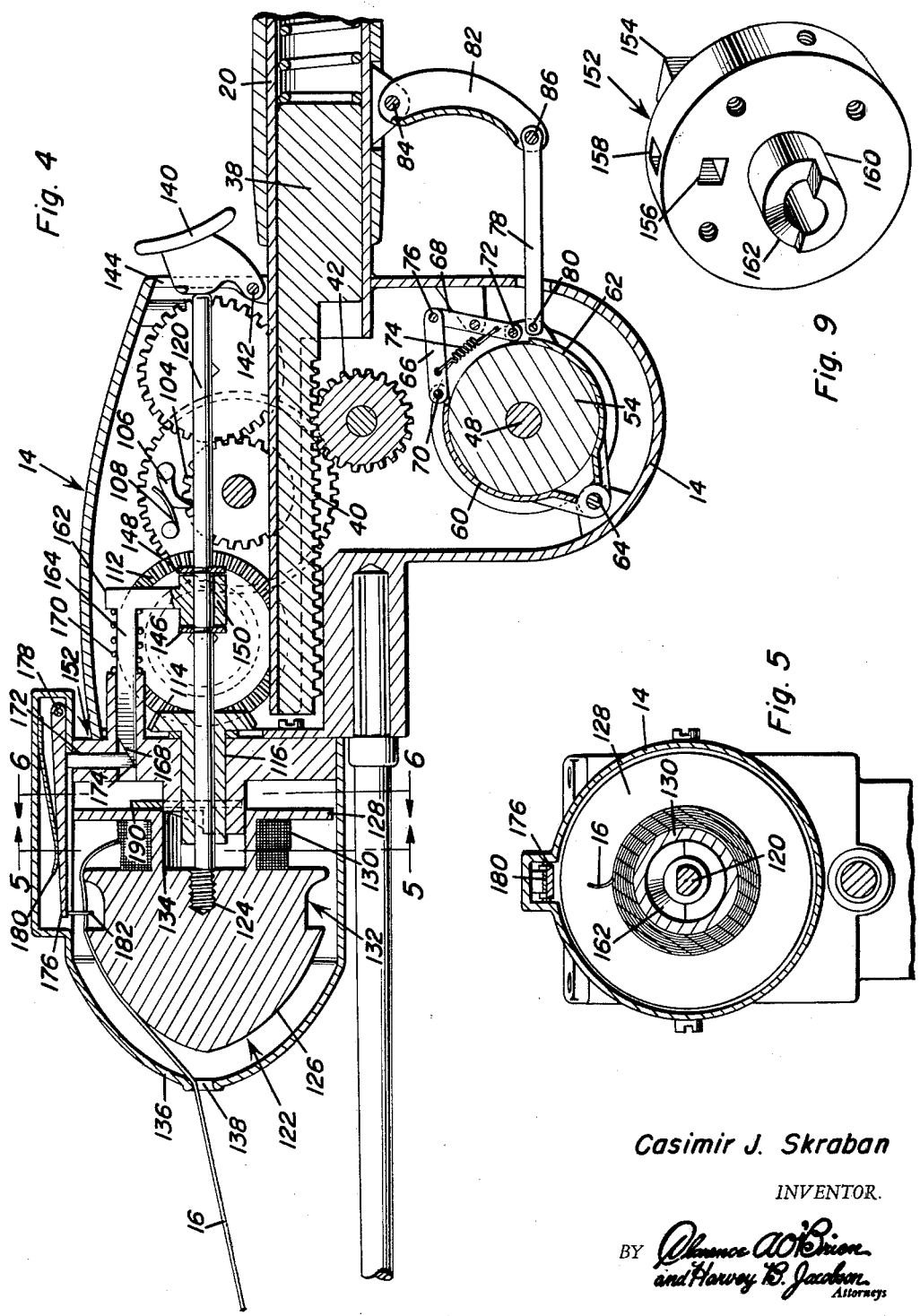

This invention relates generally to fishing equipment and more particularly to an automatic spin casting reel.

Inasmuch as the sport of fishing grows more popular each year, the sale and development of fishing equipment is an active commercial enterprise. Various types of improved reels and rods have been developed for specific fishing purposes. In view of this, it is the principal object of this invention to provide a novel automatic spin casting reel which enables the user to effectively cast his line and retrieve the lure or bait by depressing a trigger to actuate automatic means for driving the reel. The spring motor of the spinning reel disclosed is not intended to be utilized for the purpose of bringing in fish or breaking loose from a snag, but is principally for the purpose of retrieving the lure or bait.

It is a more particular object of this invention to provide an automatic spin casting reel which is accommodated in a housing including a hollow handle receiving a spring therein. An elongated rack extends into the hollow handle bearing against the spring. The rack is connected to a first gear train which in turn is associated with the spinning head. Brake means are provided for preventing transmission of power through the first gear train and a brake releasing trigger is supported on the handle for releasing the rack and first gear train, to drive the spinning head in order to retrieve the lure or bait.

It is a still further object of this invention to provide a second gear train carried within the housing which is manually operable to motivate the spinning head for retrieving lure or bait.

The automatic spin casting reel also includes a rod slidably and rotatably mounted within the housing. The spinning head is terminally secured to one end of the rod while a push button actuator is carried by the housing at the opposite end of the rod. The line is wound about a channel portion of the spinning head between a nose portion and a flange portion. An opening is formed in the housing with the line extending from the channel portion through the opening. When preparing to cast the push button actuator is depressed so as to move the rod forwardly to carry the forward face of the nose portion of the spinning head into engagement with the inner face of the housing portion so as to lock the line therebetween. When the push button actuator is released, the rod is moved rearwardly to an intermediate position with the forward face of the spinning head slightly spaced from the inner face of the housing in order that the line may be payed-out through the opening. A circumferential groove is formed in the nose portion of the spinning head and the groove must be free from obstructions when the line is being cast. When the trigger is pulled so as to release the brake, the spring in the hollow handle drives the spinning head through the gear train. The above mentioned rod moves rearwardly to its extreme rearward position when the spinning head begins to turn and a pivotally mounted arm drops so as to extend a finger into the groove of the nose portion enabling the line to bear against the finger as the spinning head spins. The line will then be properly rewound on the channel portion of the spinning head.

It is a still further object of this invention to provide an automatic spin casting reel of a relatively simple construction which is reliable, durable and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a portion of a fishing rod illustrating particularly the external detail of the handle and casting reel housing;

FIGURE 2 is a vertical sectional view taken substantially along the plane 2—2 of FIGURE 1;

FIGURE 3 is a horizontal sectional view taken substantially along the plane 3—3 of FIGURE 2;

FIGURE 4 is an enlarged vertical sectional view taken substantially along the plane 4—4 of FIGURE 3;

FIGURE 5 is a vertical sectional view taken substantially along the plane 5—5 of FIGURE 4;

FIGURE 6 is a vertical sectional view taken substantially along the plane 6—6 of FIGURE 4;

FIGURE 7 is a vertical sectional view taken substantially along the plane 7—7 of FIGURE 1;

FIGURE 8 is a fragmentary sectional view taken substantially along the plane 8—8 of FIGURE 2; and FIGURE 9 is a perspective view of a partition member which is secured in the housing.

With continuing reference to the drawing, the numeral 10 generally represents the fishing rod having a handle portion 12 and a housing 14 including the automatic spin casting reel mechanism controlling action of the line 16.

The handle 12 includes an inner wall 20 which is cylindrical and an outer cylindrical hand-grip portion 22. The inner wall 20 extends into the housing 14 through an opening defined in the rear surface 24 thereof. A coil spring 26 is accommodated within the hollow handle with the spring 26 bearing on one end against a nut 28 threaded on bolt 30. In turn, the bolt 30 is seated in a cap 32 threadedly engaged with the wall 20 as indicated at 34. A washer 36 is secured on the bolt 30 bearing against the cap 32. It will be appreciated that the nut 28 may be moved on the bolt 30 so as to adjust the location of the point of engagement between the spring 26 and nut 28.

A rack bar 38 extends into the wall 20 and bears against the spring 26. The rack 38 includes a toothed portion 40 which is engaged with gear 42 fixed to shaft 44 journalled in the housing 14. The gear 42 is meshed with gear 46 secured to shaft 48 also rotatably journalled in housing 14, as particularly illustrated in FIGURE 7. The shaft 48 has a crank 50 secured thereto by nut 52. The side surface of gear 46 has depressions thereon which are engaged with impressions on the side surface of the wheel or drum 54. The spring 56 is received on the shaft 48 and bears against the wheel 54 and the housing 14 so as to engage the wheel 54 with the gear 46, as at 58. The wheel 54 is freely mounted on the shaft 48. Arcuate brake bands or shoes 60 and 62 are engaged with the circumferential surface of the wheel 54 and are terminally hinged to the housing 14, as at 64 and also to a pair of arms 66 and 68 respectively at pivot points 70 and 72. The spring 74 urges the arms 66 and 68 together about pivot pin 76 in a manner such that the brake bands 60 and 62 frictionally engage wheel 54 to prevent the wheel from rotating. The link 78 is pivoted at point 80 to the band 62 and a trigger 82 is pivotally connected between the inner cylindrical wall 20 of the handle 12 at point 84 and the link 78 at point 86. It will be appreciated that as long as wheel 54 is prevented from movement, gears 46 and 42 are likewise prevented from movement, and rack 40 is held in position against the urging of spring 26.

The gear 90 is secured to shaft 44 while gear 92 rides free thereon. Pawl 94 is carried by gear 92 and urged by spring 96 into engagement with gear 90. Referring to FIGURE 2, it will be appreciated that gear 92 may be rotated counterclockwise with pawl 94 riding over gear 90 or gear 90 may be rotated counterclockwise by shaft 44 to drive gear 92. In turn, the gear 92 drives gear 98 secured to shaft 100. Gear 102 is also secured to shaft 100 and is connected to gear 104 riding free on shaft 100 by pawl 106 spring urged by spring 108. Referring to FIGURE 4, it will be appreciated that gear 102 may be rotated clockwise with pawl 106 riding over gear 104. In turn, the gear 102 is meshed with gear 110 fixed to bevel gear 112 meshed in driving engagement with bevel gear 114. The bevel gear 114 is formed integrally with sleeve 116 having a flat upper surface 118 which passes a shaft or rod 120. It will therefore be appreciated that the rod 120 may be rotatably driven by a longitudinal movement of the rack 38.

The spinning head generally designated as 122 is secured on rod 120 as by the threads 124. The spinning head 122 includes a forward nose portion 126 and a rear flange or spool portion 128 with a channel portion 130 defined therebetween. A groove 132 is formed in the nose portion 126 for purposes to be more particularly described below. The line 16 is wound in the channel portion 130. A cavity 134 is formed within the circumferential channel portion. The forward face of the nose portion 126 of the spinning head 122 is of the same shape as the inner face 136 of the housing 14. An opening 138 is formed in the housing 14 which passes the line 16 therethrough.

A button actuator 140 is pivoted to the housing by pivot pin 142 with the button extending hrough a housing opening 144. The actuator 140 is engaged with the rod 120 and as may be appreciated, may move the rod 120 forwardly from the position illustrated in FIGURES 2 and 4. A pair of spaced washers 146 and 148 are secured on the rod 120 and lock the collar portion 150 in place thereon. A partition member 152 is received within the housing 14. The partition member 152 is basically disk-shaped but includes a square rear boss 154 having a square opening 156 extending therethrough and communicating with the square opening 158; it being noted that square openings 156 and 158 respectively extend horizontally and vertically. A boss 160 extends perpendicular to the forward face of the partition member 152. The boss 160 is substantially cylindrical except however, the forward face thereof is diagonally cut as is indicated at 162 in FIGURE 9. Extending upwardly from the collar 150 is an arm 162 having an arm 164 perpendicularly formed therewith. The arm 164 extends into the square opening 156 and is beveled at its forward end 168. A spring 170 is carried by the arm 164 bearing against the boss 154 and the arm 162. A slidable projection 172 is beveled at 174 and rests on the beveled portion 168 of arm 164. Secured to the projection 172 is an arm 176 pivotally mounted by pivot pin 178. The spring 180 bears against the arm 176 to urge it downwardly so as to tend to move the line guide or finger 182 into the groove portion 132 of the spinning head 122. The finger 182 may be seen clearly in FIGURE 8.

Attention is now called to FIGURE 6 wherein the rear surface of the flange portion 128 is illustrated. Therein it will be noted that a lever 190 is pivoted to the flange portion 128 by pivot pin 192. A spring 194 is secured to the rear flat surface at 196 and to the lever 190 at point 198. A pin 200 is retained in the rear surface of the flange portion 128 and rides in slot 202 formed in the lever 190.

The operation of the device to this point will here be considered. If it is desired to cast, the push button actuator 140 is initially depressed so as to carry the rod 120 forwardly to carry the forward base of the nose portion 126 of the spinning head 122 into engagement with the inner face 136 of the housing 14 so as to secure the line 16 therebetween. In initially depressing the button actuator 140, the bevel surface 168 of arm 164 is carried forwardly to lift projection 172, arm 176, and finger 182. When the button 140 is released, the spring 170 bearing against the boss 154 carries the rod 120 to an intermediate position toward the rear of the extreme forward position. The rod 120 is prevented from moving to the rear extreme position inasmuch as the lever 190 moved by spring 194 came into abutting engagement with the forward surface of the boss 160 when the rod 120 was in its extreme forward position. Therefore, in the intermediate position, the forward face of the nose portion is spaced from the inner face 136 of the housing sufficiently so that the line 16 may unreel from the channel 130 through the opening 138. It is to be appreciated that the finger 182 is now held in a raised position out of the groove portion 132. It is of course necessary that the finger 182 be out of the groove portion 132 so as to allow the line 16 to reel off the line portion spooled in the channel portion. The line may be properly cast when the rod 120 is in the intermediate position. Now, when it is desired to retrieve the lure or bait, the trigger 82 may be pulled rearwardly so that the link 78 will spread the brake bands 60 and 62 to allow the wheel 54, gear 46 and gear 42 to move. The spring 26 will then drive the rack 38 forwardly and the first gear train including gears 90, 92, 98, 102, 110, 112, and 114 will turn the spinning head 122. As the spinning head turns, the lever 190 of couse will be turned and it will ride up on the diagonal forward surface 162 of boss 160 of partition member 152. With the lever 190 then bearing against the cylindrical circumferential surace of boss 160, as is indicated in FIGURE 6, the spring 170 may carry the rod 120 back to its extreme rearward position. The extreme rearward movement of the rod 120 will cause the projection 172, arm 176 and finger 182 to drop so that the line 16 will bear against the finger 182 as the spinning head 122 turns in order that the line 16 is properly drawn into the channel portion 130 and onto the spool disposed therein. It will be appreciated that the crank 50 may be utilized to reset the spring 26 after it has ben triggered inasmuch as the crank will turn the gear 46 which will in turn turn the gear 42 to draw in the rack 38.

A second crank 206 is operatively connected to gear 208 and through a second gear train including gear 104 driving gear 102 by pawl 106 and thence through gears 110, 112 and 114. It will therefore be apparent that the line may be reeled in by utilizing the automatic means actuatable by the trigger 82 or manually by utilization of the crank 206.

In order to cock spring 26, it is merely necessary to turn crank 50 counterclockwise so as to rotate shaft 48. Gear 46 secured to shaft 48 will in turn rotate gear 42 to move rack 38 rearward and place spring 26 in tension. As gear 42 rotates, shaft 44 to which it is secured turns and gear 90 is turned, riding under pawl 96 carried by gear 92 riding freely on shaft 44. If it is desired to maintain the spinning head turning, the crank 50 may be brought up to repeatedly re-cock the spring 26 enabling lure or bait to be retrieved at any distance cast.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A casting reel comprising a housing, a line spool rotatably and slidably mounted in the housing and engageable therewith, means for engaging the spool with the housing for releasably clamping and anchoring a line from said spool therebetween preparatory to casting said line, means for disengaging the spool from the housing for freeing said spool and the line for casting said line, and resilient means for rotating the spool for retrieving the line.

2. A casting reel in accordance with claim 1, wherein the first-named means includes a supporting shaft for the spool affixed thereto and rotatably and slidably mounted in the housing.

3. A casting reel in accordance with claim 2, wherein said shaft is manually slidable in one direction for engaging the spool with the housing, the second-named means including a spring operatively connected to the shaft for slidably actuating same in the opposite direction.

4. A casting reel comprising a housing, a line spool operable in the housing and engageable therewith, means for engaging the spool with the housing for releasably clamping and anchoring a line from said spool therebetween preparatory to casting said line, means for disengaging the spool from the housing for freeing said spool and the line for casting said line, and means for actuating the spool for retrieving the line, the last-named means comprising a rack bar mounted for reciprocation in the housing and operatively connected to the spool, and a spring operatively connected to said rack bar for projecting same from a retracted position for rotating the spool in a direction to wind the line thereon.

5. A casting reel in accordance with claim 4, together with a brake mounted in the housing and operatively connected to the rack bar for releasably securing same in said retracted position.

6. A casting reel in accordance with claim 5, said brake including a rotary drum in the housing, means including gears operatively connecting the drum to the rack bar, said brake further including shoes in the housing operatively engageable with the drum, resilient means yieldingly engaging the shoes with the drum, and means for manually disengaging the shoes from the drum.

7. A casting reel in accordance with claim 5, together with a shaft journaled in the housing, gears operatively connecting said shaft to the rack bar, and an operating handle on the shaft for actuating same for retracting the rack bar.

8. A casting reel in accordance with claim 4, together with a retractible guide in the housing engageable when in an operative position with the line for directing the line to the spool as said line is retrieved, and means in the housing for retracting the guide to an inoperative position out of engagement with the line when the spool is moved toward engaging relation with the housing.

9. A casting reel in accordance with claim 2, together with a retractible guide in the housing engageable when in an operative position with the line for directing the line to the spool as said line is retrieved, means operatively connecting the shaft to the guide for actuating said guide to inoperative position out of engagement with the line when the spool is moved toward engaging relation with the housing, and means for returning the guide to said operative position when the spool is moved away from the housing.

References Cited in the file of this patent

UNITED STATES PATENTS

| | | |
|---|---|---|
| 491,955 | Singer | Feb. 14, 1893 |
| 651,639 | Ray | June 12, 1900 |
| 2,262,637 | Fanshier | Nov. 11, 1941 |
| 2,507,457 | Rix | May 9, 1950 |
| 2,672,304 | Kaufman | Mar. 16, 1954 |
| 2,716,301 | Lockwood | Aug. 30, 1955 |
| 2,763,483 | Slayton | Sept. 18, 1956 |
| 2,931,592 | Sloan | Apr. 5, 1960 |
| 3,000,586 | Mandolf | Sept. 19, 1961 |